United States Patent
Doumbos

(10) Patent No.: US 10,781,745 B2
(45) Date of Patent: Sep. 22, 2020

(54) BOOST DEVICE DIVERTER VALVE SYSTEM

(71) Applicant: TURBOSMART PTY LIMITED, Wetherill Park, NSW (AU)

(72) Inventor: Christopher Doumbos, Mortdale (AU)

(73) Assignee: TURBOSMART PTY LIMITED, Wetherill Park (AU)

( * ) Notice: Subject to any disclaimer, the term of this patent is extended or adjusted under 35 U.S.C. 154(b) by 53 days.

(21) Appl. No.: 16/174,413

(22) Filed: Oct. 30, 2018

(65) Prior Publication Data

US 2019/0136750 A1    May 9, 2019

(30) Foreign Application Priority Data

Oct. 30, 2017  (AU) ................ 2017904391

(51) Int. Cl.
| | |
|---|---|
| *F02B 37/02* | (2006.01) |
| *F16K 31/06* | (2006.01) |
| *F02B 37/16* | (2006.01) |
| *F02C 6/12* | (2006.01) |

(52) U.S. Cl.
CPC ............ *F02B 37/16* (2013.01); *F02C 6/12* (2013.01); *F16K 31/0655* (2013.01); *F02B 37/162* (2019.05); *F02B 2037/162* (2013.01); *F05D 2220/40* (2013.01)

(58) Field of Classification Search
CPC .... F02B 37/16; F16K 31/065; F16K 31/0655; F02C 6/12
See application file for complete search history.

(56) References Cited

U.S. PATENT DOCUMENTS

| | | | |
|---|---|---|---|
| 7,533,656 B2* | 5/2009 | Dingle .................... | F01L 7/02 123/188.5 |
| 2014/0318122 A1* | 10/2014 | Begley et al. .......... | F02B 37/16 60/602 |
| 2016/0146374 A1* | 5/2016 | Graichen et al. ... | F16K 31/0648 137/554 |

* cited by examiner

*Primary Examiner* — Kevin L Lee
(74) *Attorney, Agent, or Firm* — Venable LLP; Michele V. Frank

(57) ABSTRACT

A boost device diverter control valve (1) has a body (2) with an inlet port (3) extending between a distal end (4) adapted to be disposed in communication with an intake of the boost device and a proximal end (5) in or adjacent the body (2). A piston chamber (6) is in communication with the proximal end (5) of the body inlet port (3) and includes a piston chamber inlet port (7). Piston chamber (6) has a piston (8) disposed therein and movable between a closed position substantially sealing the inlet port distal end (4) and an open position allowing communication between the body inlet port (4) and the piston chamber (6) where the piston (8) is resiliently biased towards the closed position. A longitudinally extending three-way solenoid valve (15) is in communication with chamber (6) and has a solenoid inlet (18) in communication with the body inlet port (3) via a body channel (19) extending between them where the solenoid (18) has a first solenoid output allowing communication between the piston chamber inlet port (7) and the piston chamber (6) and a second solenoid output allowing communication between the piston chamber (6) and a body outlet port (22). A one-way valve (24) disposed in the body outlet port (22) allowing flow therefrom.

10 Claims, 5 Drawing Sheets

BOOST DEVICE DIVERTER VALVE SYSTEM

FIELD OF THE INVENTION

The invention relates to boosting system diverter valve control for turbocharged or supercharged applications.

The invention has been developed primarily for use in motor vehicle turbocharged or supercharged engines and will be described hereinafter with reference to this application. However, it will be appreciated that the invention is not limited to this particular field of use.

BACKGROUND ART

Modern original equipment (OE) manufacturers of turbochargers or superchargers implement electronic controlled diverter valves often known as blow off valves. These are solenoid operated plungers which when activated by the vehicle engine control unit (ECU) allow for a diversion aperture to be exposed bypassing any compressed gas that the turbocharger has produced back into the air inlet tract to avoid compressor surge or for torque management purposes such as for traction control.

Contemporary OE diverter valves are usually placed on the compressor cover of the turbocharger via a flange, likely for packaging and cost purposes by reducing the overall bill of materials. Due to the integrated diverter valve flange, there is also an integrated bypass path in the diverter valve that works to divert the compressed gas back into the air inlet tract of the compressor.

The OE diverter valve is electronically actuated by signals from the ECU, which is monitoring engine parameters and also driver inputs, such as throttle position. As the compressor surge phenomenon occurs with rapid changes in mass flow rate (thus throttle position), majority of the logic control is driven off the throttle pedal position. If the ECU detects a gradient change in pedal position, the ECU will trigger the solenoid to energise for a period of roughly 2 seconds. This can be seen in a turbocharged 2017 Volkswagen Mk7 Golf R, for example.

When the solenoid energises in response to an ECU signal a ferritic plunger acts against a biased spring to lift a valve, this motion exposes the bypass path of the compressor scroll and the inlet tract for turbocharged applications, allowing for the air to divert away back into a lower pressure region, the inlet tract, away from the engine and reducing or eliminating compressor surge.

If the ECU detects a change in pedal position once it has activated, the ECU may de-energise the solenoid at which point the spring force will overcome the pressure acting on the valve member and shut the valve member, sealing off the diversion aperture for the bypass path.

There are various types of OE diverter valve designs, all feature an electronic solenoid activated plunger. The valve actuation connection and sealing technique changes depending on the revision or manufacturer of the diverter valve.

One type, for example, is found on a Pierburg™ recirculation valve (Part No. 06H154710C). This features a plastic basket type plunger with holes that allow for the air to pass through the valve and act onto the opposing side of the valve, from which this is assumed to balance the forces across the valve allowing only for the internal biasing spring to retain the valve in a closed position. It is also noted that the plastic material does not provide a positive type seal and allows for compressed gas to bypass around the plunger and into the inlet duct, reducing the potential compressed gas that the turbocharger can provide when operating at extremities of the compressor map.

Another type utilises a similar self-balancing plastic valve member in conjunction with a diaphragm which rolls during actuation and is used as a sealing feature. The OE diverter valves are known to be problematic, not only through the proof of revision changes but also with well documented diaphragm rupture changes and reports of boost pressure increases when upgraded. Further, due to the plastic construction, inherent tolerance is required around the plastic piston and bore to allow for manufacturing inaccuracy. This clearance allows for air to leak and enter the bypass path. Running larger boost levels than standard further increases the leak problem, reducing the overall power potential of the engine.

Further, a dynamic problem of the valve staying open even though the ECU has de-energised the solenoid causes a performance loss due to a significant leak between the compressor scroll and the inlet tract being open. This only appears to occur when the diverter valve has been energised by the ECU and there is a rapid throttle position change detected, at which time the solenoid is de-energised by the ECU but due to the airflow across the valve, the dynamic performance of the diverter valve momentarily seizes and the unit remains open. The only way to escape from this condition is to close the throttle, wait for the air pressure to drop causing the valve to close due to the spring force.

Aftermarket companies produce an upgrade to these OE valves. These are designed to seal better under stressed environments, such as higher boost levels and heat. Currently there are three techniques that aftermarket valves utilise to provide an upgrade to the OE diverter valve.

One method completely bypasses the ECU signal and simply connects the diverter valve directly to the intake manifold signal, this is a common technique for most after market valves. The second method utilises a 3-port solenoid valve in a kit that is connected to the factory ECU signal wire harness, utilising the actuation signal of the ECU to determine when the diverter valve actuates. The third is the combination of the OE solenoid unit with an upgraded valve housing to reduce the deficiencies of the plastic construction whilst retaining the original ECU signal for actuation control.

All three methods are currently used in after-market diverter valves ensuring the deficiency of the factory diverter valves are overcome, however these techniques each have their own set of deficiencies.

The first method which completely bypasses the ECU signal requires additional hardware such as hoses, hose clamps, electrical load ballast to prevent detecting a fault with the diverter valve system, in some instances spacer blocks for manifold absolute pressure sensors to allow for an actuation signal. This allows for a more complicated apparatus and complexity for the end user and installer. Furthermore this technique can be effected by delayed actuation due to the requirement of sufficient vacuum required from the inlet manifold being generated first before the diverter valve can actuate. In many instances, due to the modern calibration of torque management the throttle plate does not close rapidly, and the inlet manifold generation can be delayed causing unwanted compressor surge and performance losses.

The second method retains the ECU actuation signal which allows for rapid actuation potential of the valve however this technique requires the use of a 3-port solenoid and multiple lengths of hose to connect either to the inlet manifold or to a vacuum pump reservoir. Once the ECU has activated the diverter valve signal, the 3-port solenoid activates and allows for the pressure on the opposing side of the valve member to be less and thus overcome the spring bias allowing for the valve to actuate, exposing the bypass path. This technique is delayed similarly when used in conjunction with the inlet manifold as per technique one. However, when utilised with a vacuum pump reservoir, the response is sufficient. Due to the complexity of requiring a remote mount bracket, further hose lengths to link the ports of the 3-port solenoid, inlet manifold/or vacuum pump reservoir and diverter valve, hose clamps, OE connector plug or bypass plug if the correct plug is not supplied creates a lengthy and complicated installation process with multiple failure leak points.

The third method retains the ECU activation signal by utilising the OE solenoid and requires the user to manually disassemble the plastic valve, remove the biasing spring, install an uprated spring, potentially a new seal and mount this to an uprated valve body which features a pilot valve that allows for a diversion aperture to be exposed when the ECU decides to actuate the diverter valve, which then removes the force balance and allows for the valve to actuate.

This retains all of the OE function of the diverter valve while allowing for a higher level of boost to be achieved, due to the spring being sized accordingly to what the energised force of the solenoid is capable of providing. However, the face seal does not work as effectively as designed and in harsh applications, the valve leaks across the bypass path of the OE device.

Furthermore, the plunger which exposes a diversion aperture features an O-ring that seals onto a valve body, this O-ring seal is driven by an uprated spring which occasionally does not seal correctly and the unit has problematic operation due to not being able to allow for the force balancing feature to act correctly as the top chamber now leaks slightly into the inlet tract.

GENESIS OF THE INVENTION

The genesis of the present invention is a desire to provide a boost device diverter control valve that overcomes one or more disadvantages of the prior art, or to provide a useful alternative.

SUMMARY OF THE INVENTION

In accordance with an aspect of the present invention there is disclosed a boost device diverter control valve comprising:
  a body having an inlet port extending between a distal end adapted to be disposed in communication with an intake of the boost device and a proximal end in or adjacent the body;
  a piston chamber in communication with the proximal end of the body inlet port, the piston chamber including a piston chamber inlet port;
  a piston disposed within the piston chamber and movable between a closed position substantially sealing the inlet port distal end and an open position allowing communication between the body inlet port and the piston chamber, the piston being resiliently biased towards the closed position;
  a longitudinally extending three-way solenoid valve at least part disposed within the body, the solenoid valve having:
    a solenoid inlet in communication with the body inlet port via a body channel extending therebetween,
    a first solenoid output allowing communication between the piston chamber inlet port and the piston chamber; and
    a second solenoid output allowing communication between the piston chamber and a body outlet port; and
  a one-way valve disposed in the body outlet port allowing flow therefrom.

It can therefore be seen there is advantageously provided a boost device diverter control valve that requires no additional hosing, etc or wiring other than the ECU harness and no manifold vacuum is required for actuation. The diverter control valve actuates with a significantly shorter lag time due to the use of the longitudinally extending 3-way solenoid valve.

BRIEF DESCRIPTION OF THE DRAWINGS

A preferred embodiment of the invention will now be described, by way of example only, with reference to the accompanying drawings in which.

DETAILED DESCRIPTION

Figure 1:
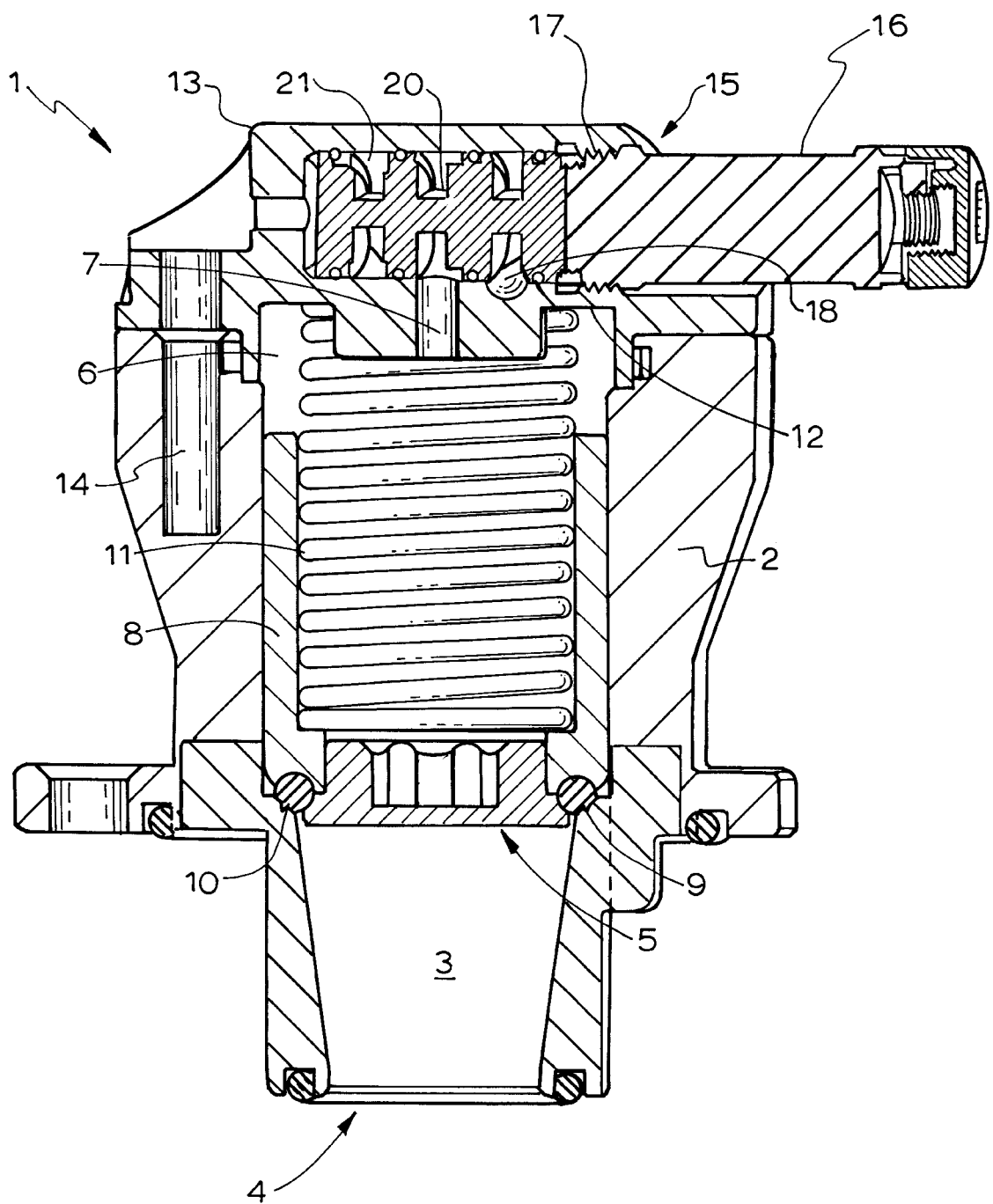
FIG. 1 is a cut-away front view of a diverter control valve according to the preferred embodiment.
Figure 2:
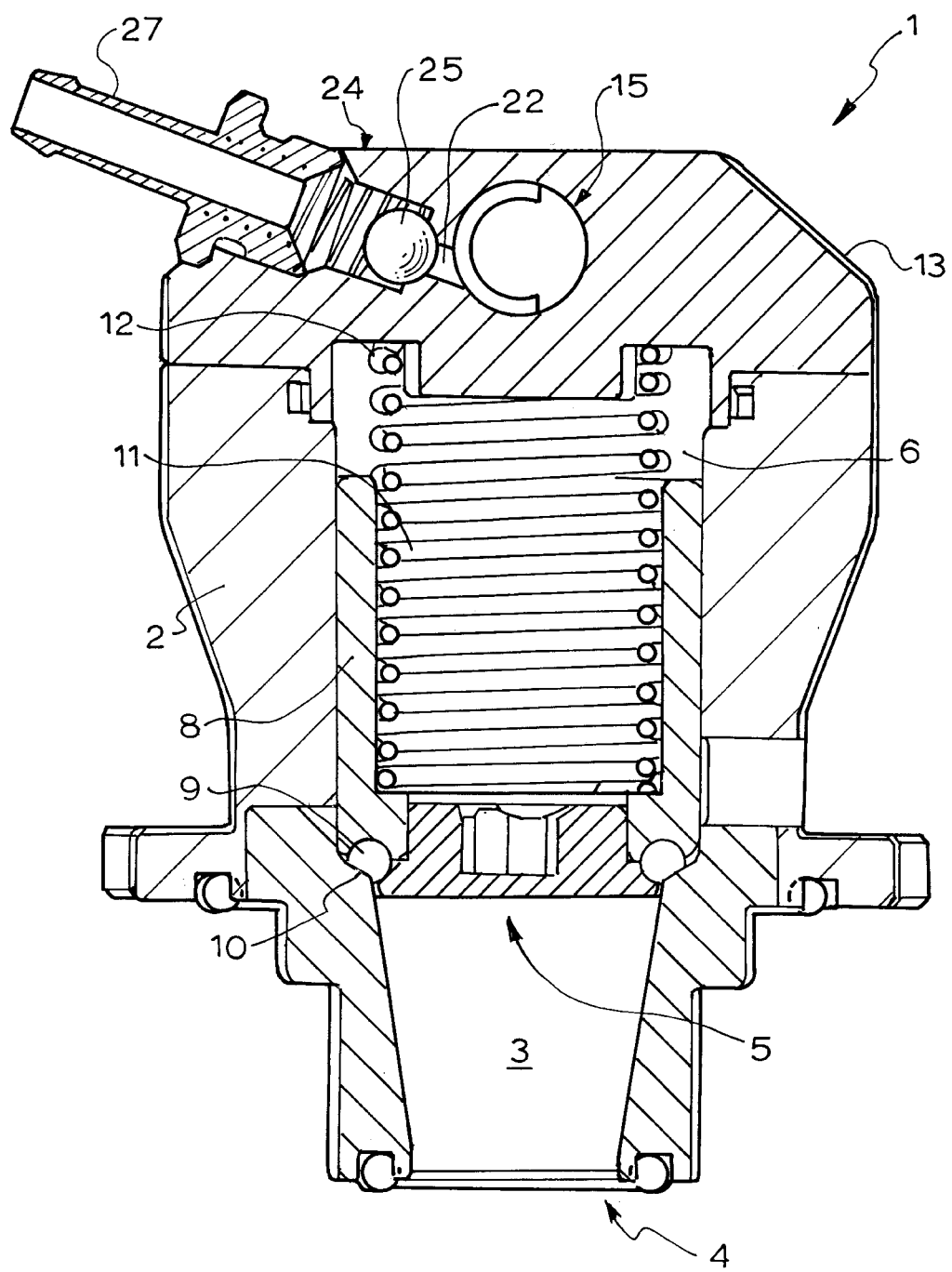
FIG. 2 is a cut-away left side view of the diverter control valve of FIG. 1.
Figure 3:
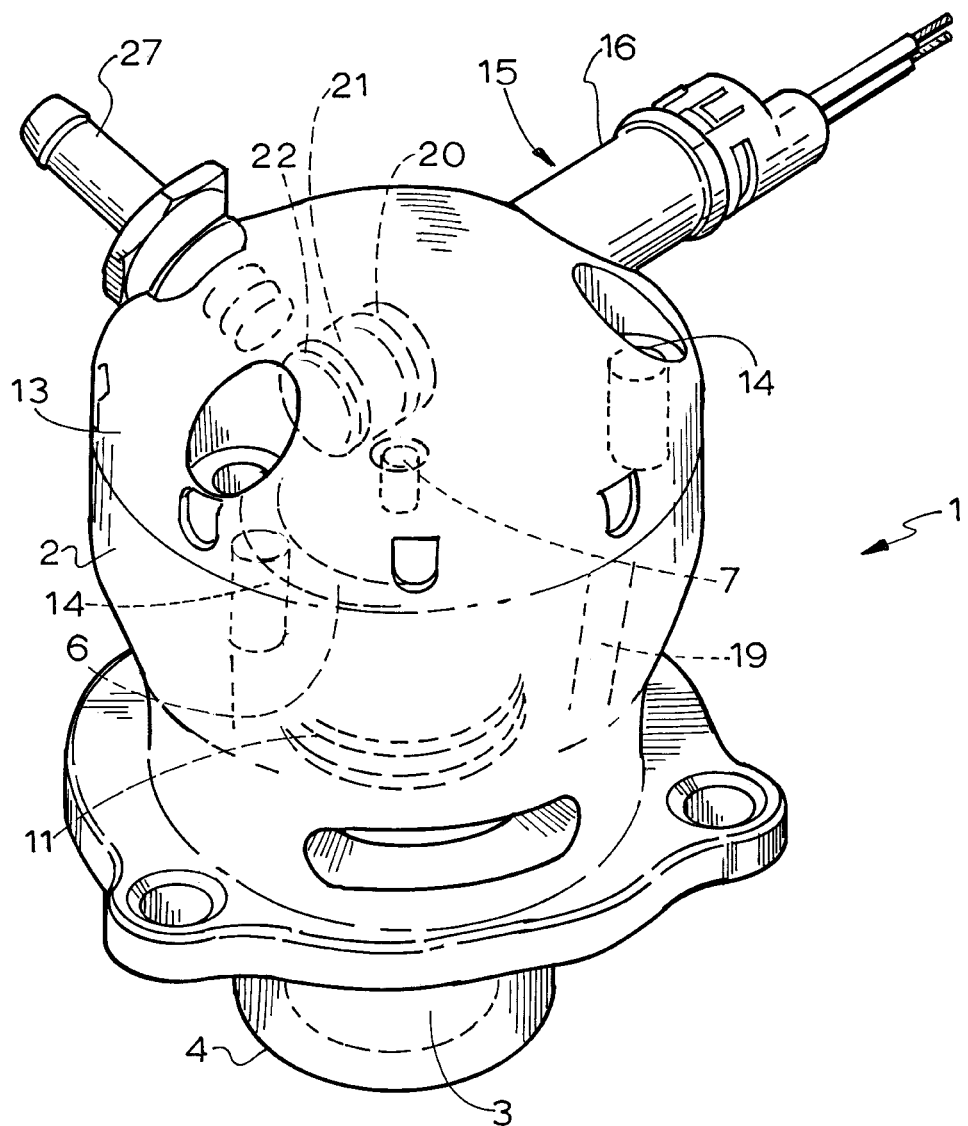
FIG. 3 is an isometric elevated front perspective view of the diverter control valve of FIG. 1.
Figure 4:
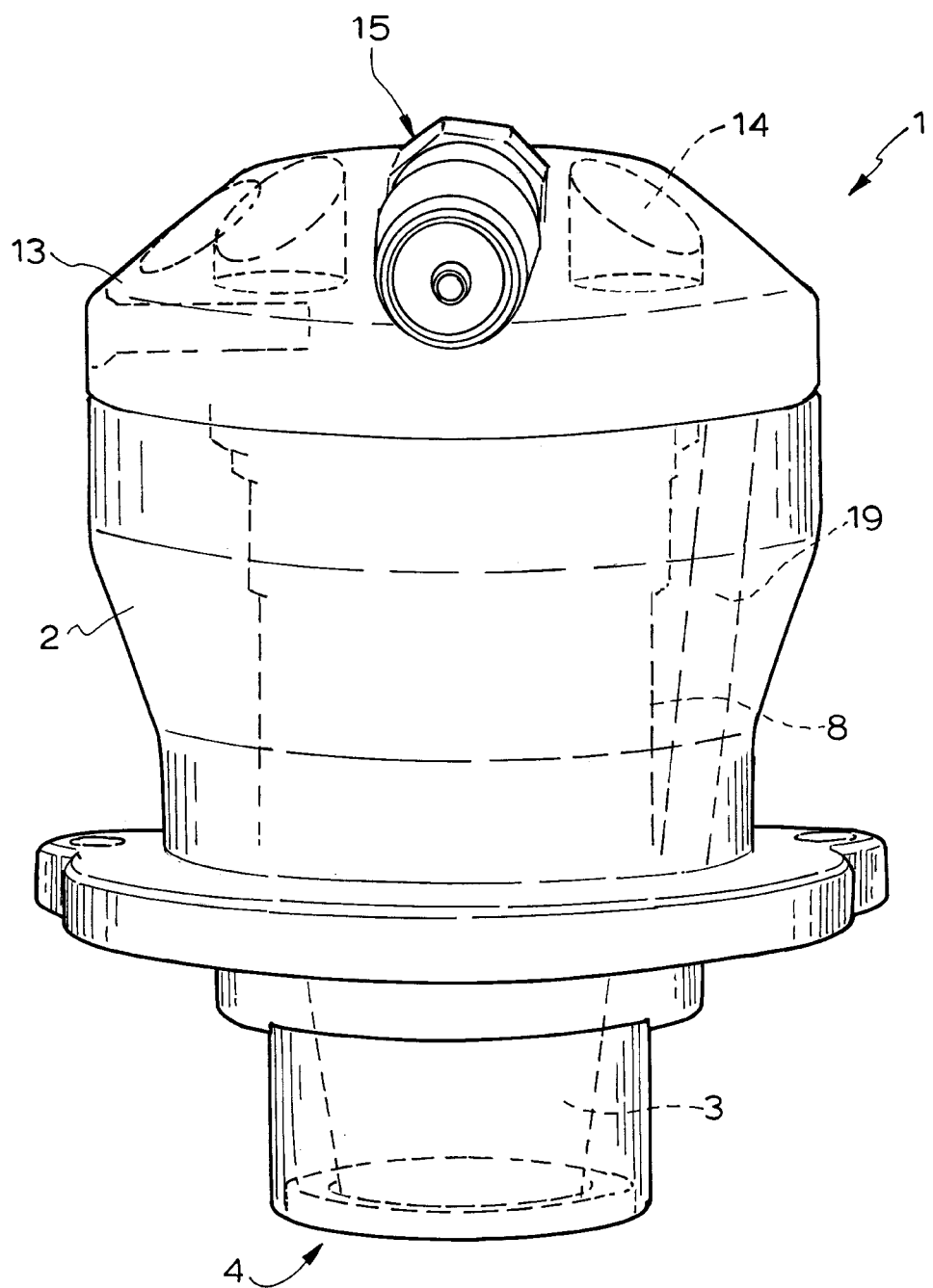
FIG. 4 is a rendered right side view of the diverter control valve of FIG. 1 without the body outlet port one-way valve.
Figure 5:
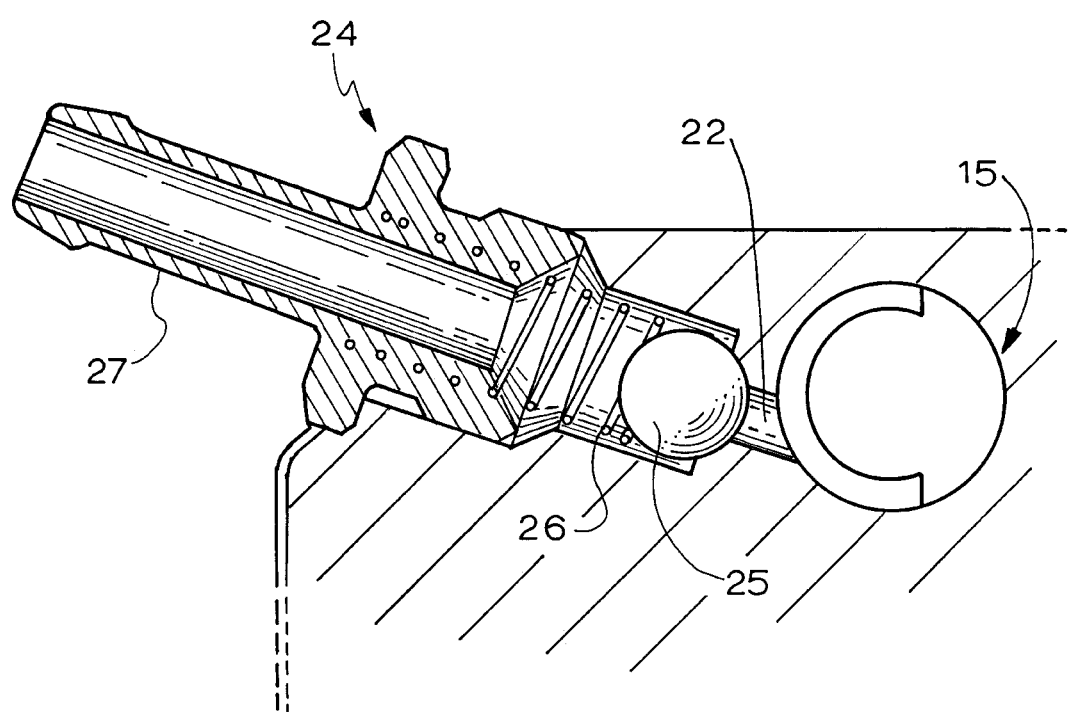
FIG. 5 is a cut-away side view of the body outlet port and one-way valve of the diverter control valve of FIG. 1.

Referring to the drawings generally, like reference numerals are used to denote like components unless expressly noted otherwise. FIGS. 1 to 4 show various views of the diverter control valve 1 of the preferred embodiment and FIG. 5 is an expanded view of part of the diverter control valve of FIGS. 1 to 4.

The boost device diverter control valve 1 of the preferred embodiment is adapted to be mounted to, or adjacent to a high pressure side of the intake manifold of a turbocharger boost device (not illustrated). The diverter control valve 1 of the preferred embodiment is designed to selectively by-pass air from the high-pressure or compressor side of the inlet manifold to atmosphere or to the low-pressure side of the intake manifold to avoid over-pressuring the engine air intake. Valve 1 is also sometimes known as a blow-off valve.

The diverter control valve 1 includes a body 2 machined from an aluminium billet in the preferred embodiment. A body inlet port 3 extends between a distal end 4 adapted to be disposed in communication with an intake of the boost device (not illustrated) and a proximal end 5 in the body 2. Although not illustrated, it will be appreciated the proximal end 5 of the inlet port 3 need not terminate in body 2 but can terminate at a face of the body 2 or to a flange or port extending therefrom.

A piston chamber 6 is disposed in the body 2. The chamber 6 is in communication with the proximal end 5 of the body inlet port 3. The piston chamber 6 also includes a piston chamber inlet port 7. A piston 8 is disposed within the piston chamber 7 and is movable between a closed position (shown in the drawings) substantially sealing the inlet port distal end 4 via an O-ring 9 against shoulder 10, and an open position (not illustrated) where O-ring 9 is moved subsequent to movement of the piston 8 allowing communication between the body inlet port 3 and the piston chamber 6.

The piston 8 is resiliently biased towards the closed position. This is preferably achieved by a compression spring 11 disposed intermediate the piston 8 and a seating ledge 12 spaced apart from the piston 8 and through which the chamber inlet port 7 enters. It will be appreciated that in the preferred embodiment this is disposed within a removably mountable cap 13 closing off the piston chamber 6 at an upper end of body 2. The cap 13 is sealed to the body with bolts (not clearly illustrated) via a plurality of radially spaced apart threaded bolt holes 14.

Also disposed within the cap 13 is part of a longitudinally extending three-way solenoid valve 15. The solenoid valve 15 includes a solenoid coil driven piston (not illustrated) in part 16 of the valve 15 that extends from the cap 13 of body 2. The other part 17 of the solenoid valve 15 is disposed within the cap 13. The three-way solenoid valve 15 has a solenoid inlet 18 in communication with the body inlet port 3 via a body channel 19 extending therebetween. This is best shown in FIG. 4.

The solenoid inlet 18 is switchable between the a first solenoid output 20 allowing communication between the piston chamber inlet port 7 and the piston chamber 6, and a second solenoid output 21 allowing communication between the piston chamber 6 and a body outlet port 22. In this way, the solenoid 15 can be energised to be actuated to allow flow from the piston camber 6 inlet port 7 through the first solenoid output 20 thereby balancing pressure across the piston 8. It will be appreciated, however, that movement of the solenoid valve 15 to allow flow though either first solenoid output 20 or second output 21 in the preferred embodiment is not clearly seen.

Similarly, the solenoid 15 can be energised such that the second solenoid output 21 allows air to pass through the body outlet port 22 where pressure from inlet port 3 moves piston 8 clear from seating ledge 12 once the spring bias is overcome. In other words, the piston 8 travel is controlled by alternating the path of pressure to the top chamber 6 of the piston 8 which controls the actuation logic for the diverter valve 1.

The diverter control valve 1 also includes a one-way valve (or check valve) 24. This is disposed in the body outlet port 22 thereby preventing air re-entering the body outlet port 22 from atmosphere or the intake manifold (not illustrated) of the turbocharger. A ball 25 is biased by a spring 26 to seal the body outlet port 22 preventing air flow back into the valve 1.

In the preferred embodiment, the compression spring 11 provides a preloading force of greater than 0.2 kg (i.e. 2N). The prevents desired pressure in the turbo inlet manifold from moving the piston 8 with the solenoid switched to the second output 21, for example. Further, the compression spring 11 can be replaced with any other preferred biasing means.

It can be seen that the first and second solenoid outputs 20 & 21 and the solenoid inlet 18 are longitudinally spaced apart. This advantageous reduces switching time when energised by an ECU harness signal. It is further noted that the solenoid 15 extends substantially perpendicularly to a direction of movement of the piston 8, however, it will be appreciated that this need not be the case. Although part of the solenoid is shown external to the body 2/cap 13, it will be appreciated the entire solenoid can be contained in body 2 or cap 13.

It can therefore be seen that in the boost device diverter control valve 1 of the preferred embodiment, the solenoid 15 is actuated by a signal generated by an engine electronic control unit (ECU) such that a signal to close the solenoid 15 opens the first solenoid output 20 and substantially equalizes the pressure across the piston 8 and the inlet port 3. A signal to open the solenoid 15 opens the second solenoid output 21 such that the piston 8 is movable in response to intake pressure at the inlet port 3 to vent boost device intake air through the body outlet port 22.

It has been noted that utilising the ECU signal for an actuation signal to the solenoid 15 proves to be beneficial due to the rapid response potential. The preferred embodiments feature the use of the 3-port solenoid 15 integrated into the valve body 2 at the cap 13. This allows for the complexity of the hoses, potential leak points and installation headache to be excluded completely. Importantly, this also increases the response time to be as fast as possible due to a direct path for the actuation signal not requiring to fill the volume of length of a hose.

The body channel 19 (best seen in FIG. 4) in the valve body 2 links the inlet port 3 pressure produced by the compressor cover with the top side of the piston 8 to balance the forces across the valve via the 3-port solenoid 15 integrated into the valve body 2.

The biased return compression spring 11 is provided in the valve body 2 and as noted has a preload force greater than 2N (greater than 0.2 kg). This is to ensure the valve 1 does not suffer from the same dynamic issue as known OE diverter valves when the ECU de-energises the solenoid and the valve member hangs in the open position, causing a significant leak and performance loss.

This biased return spring 11 and the balanced piston 8 allows for the valve 1 to remain closed at any condition when the ECU has not energised the 3-port solenoid, allowing for a substantially leak free diverter valve system.

When the ECU activates a diverter valve signal, this is connected to the 3-port solenoid 15 via an OE harness (not shown). The signal energises the 3-port solenoid 15 and allows the pressure on the opposing side of the piston 8 which is in the top side to be vented via one-way/check valve 24. This then only allows for pressure to escape the valve body 2 and not be sucked in from the atmosphere if vented there.

It can be seen then that the check valve 24 and biased return spring 26 have been designed in such a way that once the ECU energises the 3-port solenoid 15, the pressure is rapidly evacuated from the top side of the valve 1 in body 2, allowing for the downstream pressure to actuate the valve 24 and vent air from the body outlet port 22 out through the check valve 24. Once the ball 25 has lifted to the maximum position, the pressure will gradually reduce until the check valve 24 will close, and not allow for air to enter back into the body outlet port until the ECU de-energises the diverter valve signal, switching the circuit within the 3-port solenoid. This ensures the valve 1 is open the entire time the ECU is energising the 3-port solenoid 15 while preferably featuring an uprated return spring 11 to alleviate the dynamic performance issue with the OE diverter valve staying open and not allowing for any leaks.

In FIG. 5, there is shown a check valve retaining insert 27 which also acts as an outlet to bleed the pressure in the top side of the piston 8 when the solenoid 15 is energised. This air bleed may either divert to the atmosphere or directly back into the recirculation path of the diverter valve allowing for an emissions friendly device, as noted above.

The check valve return spring 26 is sized and has a preloading force to allow the ball valve 25 to open when pressurised from the body outlet port 22 and close at ideally as close to atmospheric pressure as possible to allow for minimal pressure effects trying to close the piston 8.

As best seen in FIG. 5 perhaps, the path feeding into the 3 port solenoid 15 is electronically switchable and links to the piston chamber 6 when the solenoid is energised allowing for the check valve 24 to perform its function. Otherwise when the solenoid is in the de-energised state, the check valve is dormant in function.

Due to the integrated 3-port solenoid 15 in the cap 13, this drastically reduces the requirement for additional hoses, installation steps, mounting brackets, hose clamps, requirement to tap into vacuum/manifold reservoirs. This accordingly improves the simplicity of installation of the diverter control valve 1 and it has been found that the design of the preferred embodiment is lighter than devices operating the third method (described in the Background section above) that are currently available as after-market replacements without compromising any performance and retaining OE response.

The foregoing describes only one embodiment of the present invention and modifications, obvious to those skilled in the art can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A boost device diverter control valve comprising:
a body having an inlet port extending between a distal end adapted to be disposed in communication with an intake of a boost device and a proximal end in or adjacent the body;
a piston chamber in communication with the proximal end of the body inlet port, the piston chamber including a piston chamber inlet port;
a piston disposed within the piston chamber and movable between a closed position sealing the inlet port distal end and an open position allowing communication between the body inlet port and the piston chamber, the piston being resiliently biased towards the closed position;
a longitudinally extending three-way solenoid valve at least part disposed within the body, the solenoid valve having:
a solenoid inlet in communication with the body inlet port via a body channel extending therebetween,
a first solenoid output allowing communication between the piston chamber inlet port and the piston chamber; and
a second solenoid output allowing communication between the piston chamber and a body outlet port; and
a one-way valve disposed in the body outlet port allowing flow therefrom.

2. The boost device diverter control valve according to claim 1 wherein the piston is resiliently biased towards the closed position by a compression spring such that the piston has a preload force of greater than 0.2N.

3. The boost device diverter control valve according to claim 1 wherein the body outlet port vents to atmosphere or back to the intake of the boost device.

4. The boost device diverter control valve according to claim 1 wherein the one-way valve in the body outlet port is a spring-loaded ball valve such that a ball is biased to seal the body port outlet.

5. The boost device diverter control valve according to claim 1 wherein the one-way valve is disposed within the body.

6. The boost device diverter control valve according to claim 1 wherein the first and second solenoid outputs and the solenoid inlet are longitudinally spaced apart.

7. The boost device diverter control valve according to claim 1 wherein the three-way solenoid valve extends substantially perpendicularly to a direction of movement of the piston.

8. The boost device diverter control valve according to claim 1 wherein the body channel is disposed within the housing and is integral therewith.

9. The boost device diverter control valve according to claim 1 wherein the boost device is an engine turbocharger, the intake of which has a low-pressure side and a high-pressure side.

10. The boost device diverter control valve according to claim 1 wherein the three-way solenoid valve is actuated by a signal generated by an engine electronic control unit (ECU) such that a signal to close the solenoid opens the first solenoid output and equalises the pressure across the piston, and a signal to open the solenoid opens the second solenoid output such that the piston is movable in response to intake pressure to vent boost device intake air through the body outlet port.

* * * * *